United States Patent Office 3,801,679
Patented Apr. 2, 1974

3,801,679
N - [DIMETHYLAMINOMETHYLIDENE]THIOL-(THIONO)-PHOSPHORIC ACID ESTER IMIDES
Hellmut Hoffman, Wuppertal-Elberfeld, Ingeborg Hammann, Cologne, and Gunter Unterstenhofer, Opladen, Germany, assignors to Bayer Aktiengesellschaft, Leverkusen, Germany
No Drawing. Filed Apr. 10, 1972, Ser. No. 242,736
Claims priority, application Germany, Apr. 16, 1971,
P 21 18 469.0
Int. Cl. C01n 9/36; C07f 9/24
U.S. Cl. 260—945                             7 Claims

ABSTRACT OF THE DISCLOSURE

N-[dimethylaminomethylidene]-thiol - (thiono) - phosphoric acid ester imides of the general formula $$\underset{R'O}{\overset{RS}{>}}\overset{X}{\underset{\|}{P}}-N=CH-N(CH_3)_2 \quad (I)$$

in which

X is oxygen or sulfur,
R' is alkyl with 1 to 6 carbon atoms, and
R is alkyl, alkenyl, alkinyl, aralkyl, alkylthioalkyl or alkenylthioalkyl, which possess insecticidal and acaricidal properties.

---

The present invention relates to and has for its objects the provision of particular N-[dimethylaminomethylidene]-thiol-(thiono)-phosphoric acid ester imides i.e., thiol-(thiono)-phosphoric acid ester imides wherein the oxygen ester is an alkyl radical and the thiol ester is an alkyl, alkenyl, alkinyl, aralkyl, alkylthioalkyl or alkenylthioalkyl radical, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is already known from German published specification (DAS) 1,210,835 and published Dutch patent application 6,911,925 that O,S - dialkyl - thiol(thiono)-phosphoric acid ester amides, for example O-methyl- (Compound A) or O-ethyl-S-methylthiol- (Compound B) or O,S-dimethyl - thiol - thiono-phosphoric acid ester amide (Compound C), have insecticidal and acaricidal properties.

The present invention provides N-[dimethylaminomethylidene]-thiol(thiono)-phosphoric acid ester imides of the general formula $$\underset{R'O}{\overset{RS}{>}}\overset{X}{\underset{\|}{P}}-N=CH-N(CH_3)_2 \quad (I)$$

in which X is oxygen or sulfur, R' is alkyl with 1 to 6 carbon atoms, and R is alkyl, alkenyl, alkinyl, aralkyl, alkylthioalkyl or alkenylthioalkyl.

These compounds are distinguished by a superior insecticidal and acaricidal effectiveness.

Preferably, R' is straight or branched lower alkyl with 1 to 4 carbon atoms, for example methyl, ethyl, n-propyl, iso-propyl, n-butyl, sec.-butyl, tert.-butyl or iso-butyl; and R is lower alkyl with 1 to 4 carbon atoms or alkenyl or alkinyl with 2 to 5 carbon atoms, for example vinyl, propenyl, allyl, buten-1-yl, buten-2-yl, iso-butenyl, pentenyl, propinyl, butin-1-yl or pentin-1-yl, aralkyl (for example benzyl), lower alkylthio-lower alkyl or lower alkenylthio-lower alkyl with up to 4 carbon atoms in each alkyl or alkenyl chain, for example (methyl, ethyl, n-propyl, isopropyl, n-butyl, sec.-butyl, tert.-butyl or iso-butyl)-thio-(methyl, ethyl, propyl or butyl); or allylthio-(methyl, ethyl, propyl or butyl); or propenylthio-(methyl, ethyl, propyl or butyl); or (buten-1-yl, buten-2-yl or isobutenyl)—thio-(methyl, ethyl, propyl or butyl).

The invention also provides a process for the production of a N-[dimethyl-aminomethylidene]-thiol(thiono)-phosphoric acid ester imide of the Formula I in which a thiol(thiono)-phosphoric acid ester amide of the general formula:

$$\underset{R'O}{\overset{RS}{>}}\overset{X}{\underset{\|}{P}}-NH_2 \quad (II)$$

in which R, R' and X have the meanings stated above, is reacted with N,N-dimethylformamide methylacetal of the formula:

$$\underset{CH_3}{\overset{CH_3}{>}}N-C\underset{OCH_3}{\overset{OCH_3}{<}}H \quad (III)$$

Surprisingly, the N-[dimethylaminomethylidene]-thiol-(thiono)-phosphoric acid ester imides according to the invention possess a substantially better insecticidal, especially systemic insecticidal, and most especially aphicidal, activity than the known O,S-dialkyl-thiol(thiono)-phosphoric acid ester amides of analogous constitution and of the same direction of activity. The substances according to the invention therefore represent a genuine enrichment of the art.

If O,S-dimethyl-thiol-phosphoric acid ester amide and N,N-dimethylformamide methylacetal are used as starting material, the reaction course can be represented by the following formula scheme:

$$\underset{CH_3S}{\overset{CH_3O}{>}}\overset{O}{\underset{\|}{P}}-NH_2 + \underset{CH_3O}{\overset{CH_3O}{>}}CH-N(CH_3)_2 \xrightarrow{-2CH_3OH}$$

$$\underset{CH_3S}{\overset{CH_3O}{>}}\overset{O}{\underset{\|}{P}}-N=CH-N(CH_3)_2$$

(IIa)       (III)                           (I) (IV)

As examples of thiol-(thiono)-phosphoric acid ester amides of Formula II to be used as starting materials, there may be mentioned O,S-dimethyl-, O,S-diethyl-, O,S-dipropyl-, O,S-di-isopropyl-, O,S-di-n-butyl-, O,S-di-sec.-butyl-, O,S-di-isobutyl-, O,S-di-tert.-butyl-, O-methyl-S-ethyl-, O-ethyl-S-n-propyl-, O-ethyl-S-iso-propyl-, O-ethyl-S-n-butyl-, O-iso-propyl-S-methyl-, O-iso-propyl-S-ethyl-, O-tert.-butyl-S-methyl-thiol-phosphoric acid ester amide and their thiono analogues; further, O-methyl-, O-ethyl-, O-iso-propyl-, O-n-propyl-, O-n-butyl-, O-n-tert.-butyl-S-allyl- or -S-propenyl-, -S-buten(1)yl-, -S-buten(2)yl, -S-propinyl-, -S-butin(1)yl- and -S-pentinyl-thiolphosphoric acid ester amide and the corresponding thiono analogues; further, S-methyl-, S-ethyl-, S-n- or -iso-propyl-, S-n-, sec.-, tert.-, iso-butyl-, S-allyl-, S-propenyl-, S-buten (1)yl-, S-buten(2)yl- or S-isobutenyl-thiomethylene-O-methyl- or O-ethyl-thiolphosphoric acid ester amide or the corresponding -thioethylene, -thiopropylene and -thiobutylene compounds and their thiono analogues.

Many of the thiol(thiono)-phosphoric acid ester amides of Formula II are described in the literature, e.g. German published specification DAS 1,210,835 and published Dutch patent application 6,911,925; those which are new can be prepared in analogous manner. The N,N-dimethyl formamide acetal of Formula III can also be made by methods known in the literature from dimethyl formamide, dimethyl sulfate and sodium methylate.

The preparative process according to the invention can be carried out in the presence or absence of solvents or diluents. As such, practically all inert organic solvents are suitable. These include, above all, aliphatic and aromatic optionally chlorinated hydrocarbons, such as benzene, toluene, xylene, benzine, chlorobenzene, methylene chloride, chloroform, carbon tetrachloride; ethers, such as diethyl ether, dibutyl ether, dioxane; ketones, for example acetone, methylethyl ketone, methylisopropyl ketone, methylisobutyl ketone; and nitriles, such as acetonitrile, propionitrile; and the like.

The reaction temperature can be varied within a fairly wide range. In general, the reaction is carried out at about 20 to 120° C., preferably at about 50 to 75° C.

The reaction is, in general, carried out at normal pressure. In carrying out of the process, the two components may be combined, with stirring, in the presence or absence of one of the above-mentioned solvents or diluents; the mixture may be subsequently heated to the stated temperatures for several hours, then the solvent may be removed under reduced pressure and the residue may be "slightly distilled."

The substances according to the invention are obtained in most cases in the form of colorless to slightly yellow-colored oils, which cannot be distilled without decomposition but can, however, by so-called "slight distillation," i.e. by longer heating to moderately elevated temperatures under reduced pressure, be freed from the last volatile components and in this way can be purified. The refractive index is particularly useful for their characterization.

As already mentioned, the new N-(dimethylamino-methylidene)-thiol(thiono)-phosphoric acid ester imides are distinguished by an outstanding insecticidal, above all systemic - insecticidal, and aphicidal, effectiveness against crop pests. They possess a good activity against both sucking and eating insects, and mites (Acarina), with low phytotoxicity.

For this reason, the compounds according to the invention may be used with success as pesticides, preferably in crop protection, but also against hygiene pests and pests of stored products.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella meculipennis*, the gypsy moth (*Lymantria dispar*), the browntail moth (*Euproctis chrysorrhoea*) and ten caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius-Calandra granaria*), the Colorado beetle (*Leptinotarsa decemlineata*) the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose, aerosol propellants which are gaseous at normal temperatures and pressures, such as Freon; inert dispersible liquid diluent carriers, including inert organic solvents, such as aromatic hydrocarbons (e.g., benzene, toluene, xylenes, alkyl naphthalenes, etc.), halogenated, especially chlorinated, aromatic hydrocarbons (e.g., chlorobenzenes, etc.), paraffins (e.g., petroleum and mineral oil fractions), cyclohexane, chlorinated aliphatic hydrocarbons (e.g., methylene chloride, chloroethylenes, etc.), alcohols (e.g., methanol, ethanol, propanol, butanol, glycol, etc.), ethers and esters of such alcohols (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose; emulsifying agents, such as nonionic and/or anionic emulsifying agents (e.g., polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or fungicides, bactericides, nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1-95% by weight, and preferably 0.5-90% by weight, of the mixture, whereas carrier composition mixtures suitable for direct application or field application generally contemplates those in which the active compound is present in an amount substantially between about 0.0001-10%, preferably 0.01-1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001-95%, and preferably 0.01-95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hecare, are sufficient. In this process it is possible to use highly concentrated liquid compositions with said liquid carrier vehicles containing from about 20 to about 95% by weight of the active compound or even 100% active compound or even 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Phaedon larvae test:
Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 1.

TABLE 1

[Phaedon larvae test]

| Active compound | Concentration of active compound in percent | Degree of destruction in percent after 3 days |
|---|---|---|
| $CH_3O\diagdown\underset{CH_3S\diagup}{P}-NH_2$ (known)(A) | 0.1<br>0.01<br>0.001 | 100<br>100<br>0 |
| $C_2H_5O\diagdown\underset{CH_3S\diagup}{P}-NH_2$ (known)(B) | 0.1<br>0.01<br>0.001 | 100<br>30<br>0 |

TABLE 1—Continued

| Active compound | Concentration of active compound in percent | Degree of destruction in percent after 3 days |
|---|---|---|
| (8) $CH \equiv C-CH_2-S$, $CH_3O$ — $P(=O)-N=CH-N(CH_3)_2$ | 0.1<br>0.01<br>0.001<br>0.0001 | 100<br>100<br>100<br>40 |
| (5) $CH \equiv C-CH_2-S$, $C_2H_5O$ — $P(=O)-N=CH-N(CH_3)_2$ | 0.1<br>0.01<br>0.001 | 100<br>100<br>80 |
| (4) $CH_2=CH-CH_2-S-CH_2-S$, $C_2H_5O$ — $P(=O)-N=CH-N(CH_3)_2$ | 0.1<br>0.01<br>0.001 | 100<br>100<br>100 |
| (11) $C_2H_5S-CH_2-CH_2-S$, $C_2H_5O$ — $P(=O)-N=CH-N(CH_3)_2$ | 0.1<br>0.01<br>0.001 | 100<br>100<br>40 |
| (7) $C_6H_5-CH_2-S$, $CH_3O$ — $P(=O)-N=CH-N(CH_3)_2$ | 0.1<br>0.01<br>0.001 | 100<br>100<br>50 |
| (6) $C_6H_5-CH_2-S$, $C_2H_5O$ — $P(=O)-N=CH-N(CH_3)_2$ | 0.1<br>0.01<br>0.001 | 100<br>100<br>40 |

EXAMPLE 2

*Phorodon*/resistant test (contact action):

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Hop plants (*Humulus lupulus*) which have been heavily infested with the hop aphid (*Phorodon humuli*/resistant) are sprayed with the preparation of the active compound until dripping wet.

After the specified periods of time, the degree of destruction is determined as a percentage: 100% means that all the aphids were killed; 0% means that none of the aphids were killed.

The active compounds, the concentrations of the active compounds, the evalution times and the results can be seen from the following Table 2

TABLE 2
[*Phorodon humuli* test/resistant]

| Active compound | Concentration of active compound in percent | Degree of destruction in percent after 1 day |
|---|---|---|
| (A) $CH_3O$, $CH_3S$ — $P(=O)-NH_2$ (known) | 0.1<br>0.02<br>0.004 | 95<br>60<br>30 |
| (1) $CH_3O$, $CH_3S$ — $P(=O)-N=CH-N(CH_3)_2$ | 0.1<br>0.02<br>0.004 | 100<br>98<br>80 |

Example 3

Doralis test (systemic action):

Solvent: 3 parts by weight acetone.
Emulsifier: 1 part by weight alkylarylpolyglycol ether.

To produce a suitable preparation of action compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified periods of time, the degree of destruction is determined as a percentage. 100% means that all the aphids are killed; 0% means that none of the aphids are killed.

The active compounds, the concentrations of the active compounds, the evaluation time and the results can be seen from the following Table 3:

TABLE 3
[Doralis test/systemic action]

| Active compound | Concentration of active compound in percent | Degree of destruction in percent after 4 days |
|---|---|---|
| $CH_3O$<br>$\phantom{CH_3}\searrow\overset{O}{\underset{\phantom{x}}{\|}}$<br>$\phantom{CH_3O\searrow}P-NH_2$<br>$CH_3S\nearrow$<br>(known) (A). | 0.1<br>0.01<br>0.001<br>0.0001 | 100<br>100<br>100<br>0 |
| $C_2H_5O$<br>$\phantom{CH_3}\searrow\overset{O}{\underset{\phantom{x}}{\|}}$<br>$\phantom{CH_3O\searrow}P-NH_2$<br>$CH_3S\nearrow$<br>(known) (B). | 0.1<br>0.01<br>0.001<br>0.0001<br>0.00001 | 100<br>100<br>98<br>30<br>0 |
| $CH_3O$<br>$\phantom{CH_3}\searrow\overset{S}{\underset{\phantom{x}}{\|}}$<br>$\phantom{CH_3O\searrow}P-NH_2$<br>$CH_3-S\nearrow$<br>(known) (C). | 0.1<br>0.01<br>0.001 | 100<br>75<br>0 |

TABLE 3—Continued

| Active compound | Concentration of active compound in percent | Degree of destruction in percent after 4 days |
|---|---|---|
| $CH_3O$<br>$\phantom{CH_3}\searrow\overset{O}{\underset{\phantom{x}}{\|}}$<br>$\phantom{CH_3O\searrow}P-N=CH-N(CH_3)_2$<br>$CH_3S\nearrow$<br>(1). | 0.1<br>0.01<br>0.001<br>0.0001 | 100<br>100<br>100<br>100 |
| $CH_3O$<br>$\phantom{CH_3}\searrow\overset{S}{\underset{\phantom{x}}{\|}}$<br>$\phantom{CH_3O\searrow}P-N=CH-N(CH_3)_2$<br>$CH_3S\nearrow$<br>(10). | 0.1<br>0.01<br>0.001<br>0.0001 | 100<br>100<br>100<br>90 |

Example 4

Tetranychus test:

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4.

TABLE 4
[Tetranychus test]

| Active compound | Concentration of active compound in percent | Degree of destruction in percent after 2 days |
|---|---|---|
| $CH_3O$<br>$\phantom{CH_3}\searrow\overset{S}{\underset{\phantom{x}}{\|}}$<br>$\phantom{CH_3O\searrow}P-NH_2$<br>$CH_3S\nearrow$<br>(known) (C). | 0.1 | 0 |
| $CH_3O$<br>$\phantom{CH_3}\searrow\overset{O}{\underset{\phantom{x}}{\|}}$<br>$\phantom{CH_3O\searrow}P-N=CH-N(CH_3)_2$<br>$CH\equiv C-CH_2-S\nearrow$<br>(8). | 0.1<br>0.01 | 100<br>50 |
| $C_2H_5O$<br>$\phantom{CH_3}\searrow\overset{O}{\underset{\phantom{x}}{\|}}$<br>$\phantom{CH_3O\searrow}P-N=CH-N(CH_3)_2$<br>$CH\equiv C-CH_2-S\nearrow$<br>(5). | 0.1 | 100 |
| $C_2H_5O$<br>$\phantom{CH_3}\searrow\overset{O}{\underset{\phantom{x}}{\|}}$<br>$\phantom{CH_3O\searrow}P-N=CH-N(CH_3)_2$<br>$CH_2=CH-CH_2-S-CH_2-S\nearrow$ | 0.1<br>0.01 | 100<br>30 |

TABLE 4—Continued

| Active compound | Concentration of active compound in percent | Degree of destruction in percent after 2 days |
|---|---|---|
| (4): $CH_3-CH=CH-CH_2-S\diagup\overset{C_2H_5O}{\underset{}{}}\diagdown\overset{O}{\underset{\|}{P}}-N=CH-N(CH_3)_2$ | 0.1 | 100 |
| (3): $CH_3-S-CH_2-CH_2-S\diagup\overset{C_2H_5O}{\underset{}{}}\diagdown\overset{O}{\underset{\|}{P}}-N=CH-N(CH_3)_2$ | 0.1 | 90 |
| (9): phenyl-$CH_2-CH_2-S\diagup\overset{CH_3O}{\underset{}{}}\diagdown\overset{O}{\underset{\|}{P}}-N=CH-N(CH_3)_2$ | 0.1 | 95 |
| (12): $CH_3S\diagup\overset{CH_3O}{\underset{}{}}\diagdown\overset{O}{\underset{\|}{P}}-N=CH-N(CH_3)_2$ | 0.1 | 100 |
| (1): $CH_3S\diagup\overset{CH_3O}{\underset{}{}}\diagdown\overset{S}{\underset{\|}{P}}-N=CH-N(CH_3)_2$ (10) | 0.1 | 98 |

EXAMPLE 5

Phaedon test (systemic lasting action):

Solvent: 3 parts weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration of 0.025% of active compound.

Cabbage plants (Brassica oleracea) are watered with in each case 50 ml. of the preparation of the active compound so that the preparation of the active compound penetrates into the soil without wetting the leaves of the cabbage plants. The active compound is taken up by the cabbage plants from the soil and so reaches the leaves. There are applied 12.5 mg. of active compound to 100 g. of soil (weighed air-dry).

After the specified periods of time, the plants are infested with mustard beetle larvae (Phaedon cochleariae) and their mortality is in each case determined after 3 days. 100% means that all the larvae were killed; 0% means that none of the larvae were killed.

The active compounds, the concentrations of the active compounds, the evaluation times and the results can be seen from the following Table 5:

TABLE 5

[Lasting action after watering: Phaedon cochleariae (larvae) on cabbage (Brassica oleracea]

| Active compound | Mg. active compound to 100 g. soil (weighed air-dry) | Percent destruction after— | | | | | | | | | | | | |
|---|---|---|---|---|---|---|---|---|---|---|---|---|---|---|
| | | 3 days | 6 days | 10 days | 13 days | 17 days | 20 days | 24 days | 27 days | 31 days | 34 days | 38 days | 41 days | 45 days |
| $CH_3O\diagup\overset{O}{\underset{\|}{P}}-NH_2$, $CH_3S$ (known) (A) | 12.5 | 100 | 100 | 100 | 100 | 100 | 90 | 0 | | | | | | |
| $CH_3O\diagup\overset{O}{\underset{\|}{P}}-N=CH-N\diagdown\overset{CH_3}{CH_3}$, $CH_3S$ (1) | 12.5 | 100 | 100 | 100 | 100 | 100 | 100 | 100 | 100 | 100 | 100 | 100 | 100 | 100 |

EXAMPLE 6

Myzus test (systemic lasting action):

Solvent: 3 parts by weight acetone.
Emusifier: 1 part by weight alkylarylpolyglycol ether.

To produce a suitable preparation of active compound, 1 part by weight of active compound is mixed with the stated amount of solvent which contains the stated amount of emulsifier, and the concentrate is diluted with water to the desired concentration of 0.025% of active compound.

Cabbage plants (Brassica oleracea) are watered with, in each case, 50 ml. of the preparation of active compound so that the preparation of active compound penetrates into the soil without wetting the leaves of the cabbage plants. The active compound is taken up by the cabbage plants from the soil and so reaches the leaves. There are applied 12.5 mg. of active compound to 100 g. of soil (weighed air-dry).

After the times stated, the plants are infested with peach aphids (Myzus persicae) and their mortality is, in each case, determined after 3 days. 100% means that all the aphids were killed; 0% means that none of the aphids were killed.

The active compounds, concentrations of active compound, evaluation times and results can be seen from the following Table 6:

EXAMPLE 7

Piesma test (systemic lasting action):

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration of 0.025% of active compound.

Beet plants (Beta vulgaris) are watered with in each case 50 ml. of the preparation of the active compound so that the preparation of active compound penetrates into the soil without wetting the leaves of the beet plants. The active compound is taken up by the beet plants from the soil and so reaches the leaves. There are applied 12.5 mg. of active compound to 100 g. of soil (weighed air-dry).

After the specified periods of time, the plants are infested with beet bugs (Piesma quadrata) and their mortality is in each case determined after 3 days. 100% means that all the beet bugs were killed, 0% means that none of the beet bugs were killed.

The active compounds, the concentrations of the active compounds, the evalution times and the results can be seen from the following Table 7:

TABLE 6
[Lasting action after watering: Myzus persicae on cabbage (Brassica oleracea)]

| Active compound | Mg. active compound to 100 g. soil (weighed air-dry) | 3 days | 6 days | 10 days | 13 days | 17 days | 20 days | 24 days | 27 days | 31 days | 34 days | 38 days | 41 days | 45 days |
|---|---|---|---|---|---|---|---|---|---|---|---|---|---|---|
| $CH_3O\!\!-\!\!\underset{CH_3S}{\overset{O}{\|}}\!\!P\!\!-\!\!NH_2$ (known) (A). | 12.5 | 100 | 100 | 100 | 100 | 100 | 75 | 0 | | | | | | |
| $CH_3O\!\!-\!\!\underset{CH_3S}{\overset{O}{\|}}\!\!P\!\!-\!\!N\!\!=\!\!CH\!\!-\!\!N(CH_3)_2$ (1). | 12.5 | 100 | 100 | 100 | 100 | 100 | 100 | 100 | 100 | 100 | 100 | 100 | 98 | 100 |
| $C_2H_5O\!\!-\!\!\underset{CH_3S}{\overset{O}{\|}}\!\!P\!\!-\!\!N\!\!=\!\!CH\!\!-\!\!N(CH_3)_2$ (13). | 12.5 | 100 | 100 | 100 | 100 | 100 | 100 | 100 | 100 | 100 | 80 | 70 | 60 | |
| $CH_3O\!\!-\!\!\underset{CH_3S}{\overset{S}{\|}}\!\!P\!\!-\!\!N\!\!=\!\!CH\!\!-\!\!N(CH_3)_2$ (10). | 12.5 | 100 | 100 | 100 | 100 | 100 | 100 | 100 | 100 | 80 | 20 | | | |

TABLE 7
[Lasting action after watering: Piesma quadrata on beet (Beta vulgaris)]

| Active compounds | Mg. active compound to 100 g. soil (weighed air-dry) | 3 days | 6 days | 10 days | 13 days | 17 days | 20 days | 24 days | 27 days | 31 days | 38 days | 41 days | 45 days | 48 days |
|---|---|---|---|---|---|---|---|---|---|---|---|---|---|---|
| $CH_3O\!\!-\!\!\underset{CH_3S}{\overset{O}{\|}}\!\!P\!\!-\!\!NH_2$ (known) (A). | 12.5 | 100 | 100 | 100 | 100 | 100 | 100 | 100 | 100 | 50 | 0 | | | |
| $CH_3O\!\!-\!\!\underset{CH_3S}{\overset{O}{\|}}\!\!P\!\!-\!\!N\!\!=\!\!CH\!\!-\!\!N(CH_3)_2$ (1). | 12.5 | 100 | 100 | 100 | 100 | 100 | 100 | 100 | 100 | 100 | 100 | 100 | 100 | 100 |

The following further examples are set forth to illustrate, without limitation, the process for producing the active compounds according to the present invention.

EXAMPLE 8

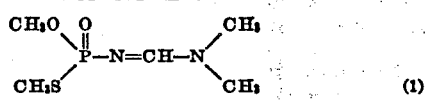
(1)

To 71 g. (0.5 mole) of O,S-dimethyl-thiolphosphoric acid ester amide there are added 70 g. (0.59 mole) of N,N-dimethylformamide methylacetal; the temperature of the mixture rises to 35° C. The mixture is subsequently heated under reflux for 3 hours, slightly distilled, the residue is dissolved in a little water and extracted with methylene chloride; after drying, the solvent is removed from the organic phase under reduced pressure and the residue is again slightly distilled. There are obtained 87 g. (89% of theory) of O,S-dimethyl-N-(N',N'-dimethylaminomethylidene)-thiolphosphoric acid ester imide with the refractive index $n_D^{23}=1.5391$.

Calc. for $C_5H_{13}N_2O_2PS$ (molecular weight 196): N, 14.3%; S, 16.3%; P, 15.7%. Found: N, 14.3%; S, 16.2%; P, 16.0%.

EXAMPLE 9

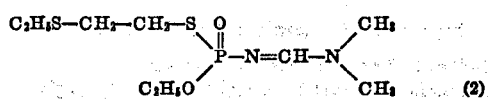
(2)

To 46 g. (0.2 mole) of S-(β-ethylthioethylene)-O-ethylthiolphosphoric acid ester amide in 100 cc. of ethanol there are added 35 g. of N,N-dimethylformamide methylacetal: the temperature of the mixture rises to 36° C. The mixture is then heated at 70° C. for 1 hour, the solvent is evaporated under reduced pressure and the residue is slightly distilled. There are obtained 52 g. (91% of theory) of S-(β-ethylthioethylene)-O-ethyl-N-(N',N'-dimethylaminomethylidene)-thiolphosphoric acid ester imide with the refractive index $n_D^{23}=1.5438$.

Calc. for $C_9H_{21}N_2O_2PS_2$ (molecular weight 284): N, 9.9%; S, 22.5%; P, 10.9%. Found: N, 9.6%; S, 22.8%; P, 10.3%.

In analogous manner, the following compounds can be prepared:

| Constitution | Physical properties (refractive index) melting point | Yield (percent of theory) |
|---|---|---|
| $CH_3-CH=CH-CH_2-S\underset{C_2H_5O}{\overset{\phantom{x}}{\diagdown}}\overset{O}{\underset{\phantom{x}}{\overset{\|}{P}}}-N=CH-N(CH_3)_2$ (3); | $n_D^{20}=1.5368$ | 70 |
| $CH_2=CH-CH_2-S-CH_2-S\underset{C_2H_5O}{\overset{\phantom{x}}{\diagdown}}\overset{O}{\underset{\phantom{x}}{\overset{\|}{P}}}-N=CH-N(CH_3)_2$ (4); | $n_D^{19}=1.5556$ | 74 |
| $CH\equiv C-CH_2-S\underset{C_2H_5O}{\overset{\phantom{x}}{\diagdown}}\overset{O}{\underset{\phantom{x}}{\overset{\|}{P}}}-N=CH-N(CH_3)_2$ (5); | $n_D^{23}=1.5418$ | 91 |
| $C_6H_5-CH_2-S\underset{C_2H_5O}{\overset{\phantom{x}}{\diagdown}}\overset{O}{\underset{\phantom{x}}{\overset{\|}{P}}}-N=CH-N(CH_3)_2$ (6); | $n_D^{25}=1.5692$ | 96 |
| $C_6H_5-CH_2-S\underset{CH_3O}{\overset{\phantom{x}}{\diagdown}}\overset{O}{\underset{\phantom{x}}{\overset{\|}{P}}}-N=CH-N(CH_3)_2$ (7); | 63° C. | 83 |
| $CH\equiv C-CH_2-S\underset{CH_3O}{\overset{\phantom{x}}{\diagdown}}\overset{O}{\underset{\phantom{x}}{\overset{\|}{P}}}-N=CH-N(CH_3)$ (8); | $n_D^{24}=1.5501$ | 82 |
| $CH_3-S-CH_2-CH_2-S\underset{C_2H_5O}{\overset{\phantom{x}}{\diagdown}}\overset{O}{\underset{\phantom{x}}{\overset{\|}{P}}}-N=CH-N(CH_3)_2$ (9); | $n_D^{20}=1.5495$ | 59 |
| $CH_3O\underset{CH_3S}{\overset{\phantom{x}}{\diagdown}}\overset{S}{\underset{\phantom{x}}{\overset{\|}{P}}}-N=CH-N(CH_3)_2$ (10); | $n_D^{24}=1.5896$ | 64 |

It will be appreciated that the instant specification and examples are set forth by way of illustration and not limitation, and that various modifications and changes may be made without departing from the spirit and scope of the present invention.

What is claimed is:

1. An N-[dimethylaminomethylidene] - thiol(thiono)-phosphoric acid ester imide of the general formula

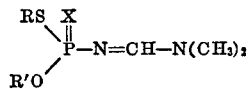

(I)

in which

X is oxygen or sulfur,

R' is alkyl with 1 to 6 carbon atoms, and

R is alkyl with 1 to 4 carbon atoms; alkenyl or alkinyl with 2 to 5 carbon atoms; aralkyl; or alkylthioalkyl or alkylthioalkyl or alkenylthioalkyl with up to 4 carbon atoms in each alkyl or alkenyl chain.

2. A compound according to claim 1, in which R is alkyl with 1 to 4 carbon atoms; alkenyl or alkinyl with 2 to 5 carbon atoms; aralkyl; or alkylthioalkyl or alkenylthioalkyl with up to 4 carbon atoms in each alkyl or alkenyl chain.

3. The compound according to claim 1 wherein such compound is O,S - dimethyl-N-(N',N'-dimethylaminomethylidene)-thiolphosphoric acid ester imide of the formula

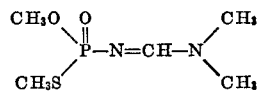

(1)

4. The compound according to claim 1 wherein such compound is O-ethyl - S - allylthiomethyl-N-(N',N'-dimethylaminomethylidene) - thiolphosphoric acid ester imide of the formula

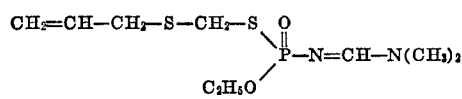

(4)

5. The compound according to claim 1 wherein such compound is O-ethyl-S-(2-butenyl)-N-(N',N'-dimethylaminomethylidene)-thiolphosphoric acid ester imide of the formula

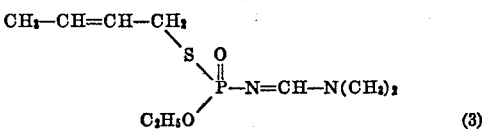

(3)

6. The compound according to claim 1 wherein such compound is O-methyl-S-propinyl-N-(N',N'-dimethylaminomethylidene)-thiolphosphoric acid ester imide of the formula

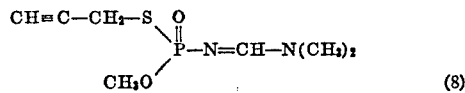

(8)

7. The compound according to claim 1 wherein such compound is O,S - dimethyl-N-(N',N'-dimethylaminomethylidene)-thiol-thiono-phosphoric acid ester imide of the formula

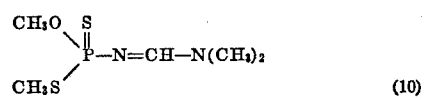

(10)

References Cited

UNITED STATES PATENTS 3,121,084   2/1964   Winberg _____ 260—968 XR

ANTON H. SUTTO, Primary Examiner

U.S. Cl. X.R.

260—964; 424—211